United States Patent [19]

Abdel-Monem et al.

[11] 3,925,433
[45] Dec. 9, 1975

[54] 1:1 AND 2:1 CHROMIUM, ALPHA AMINO ACID COMPLEX SALTS

[75] Inventors: Mahmond M. Abdel-Monem, St. Paul; Dean R. Anderson, Excelsior, both of Minn.

[73] Assignee: Zinpro Corporation, Excelsior, Minn.

[22] Filed: Sept. 24, 1973

[21] Appl. No.: 400,231

Related U.S. Application Data

[63] Continuation-in-part of Ser. No. 395,848, Sept. 10, 1973, which is a continuation-in-part of Ser. No. 163,046, July 15, 1971, abandoned.

[52] U.S. Cl. 260/438.5 R; 260/299; 260/326.13 A; 260/438.5 C; 424/287
[51] Int. Cl.² .................................... C07F 11/00
[58] Field of Search ......................... 260/438.5 R

[56] References Cited
UNITED STATES PATENTS

| | | | |
|---|---|---|---|
| 2,054,489 | 9/1936 | Stuser | 260/438.5 R X |
| 2,544,668 | 3/1951 | Goebel et al. | 260/438.5 R |
| 2,683,156 | 7/1954 | Iler | 260/438.5 R |
| 2,825,659 | 3/1958 | Dalton et al. | 260/438.5 R X |
| 3,023,072 | 2/1962 | Dabrowski | 260/438.5 R X |

OTHER PUBLICATIONS

Chem. Abstracts, Vol. 40, 4614⁵ (1946).
Chem. Abstracts, Vol. 46, 10035h–10037d (1952).
Chem. Abstracts, Vol. 54, 3039f (1960).
Chem. Abstracts, Vol. 54, 11795e (1960.
Chem. Abstracts, Vol. 54, 24425c (1960).
Chem. Abstracts, Vol. 58, 7589e (1963).
Chem. Abstracts, Vol. 59, 9563g (1963). Chem. Abstracts, Vol. 66, 101174c (1967)
Chem. Abstracts, Vol. 66, 101174c (1967).
Chem. Abstracts, Vol. 73, 51779a (1970).
Khan et al., Current Science (India) V29, p. 135 (1960).
Matsukawa et al., Bull. Chem. Soc. Japan V38 (8) pp. 1235–1239 (1965).
Khan et al., J. Ind. Chem. Soc. V 40 (7) pp. 565–568 (1963).

*Primary Examiner*—Helen M. S. Sneed
*Attorney, Agent, or Firm*—Zarley, McKee, Thomte & Voorhees

[57] ABSTRACT

Novel salts are prepared wherein the cation of the salt comprises a 1:1 ratio or 2:1 ratio of a complex ion formed between chromium, with an oxidation state of plus 3, and an alpha amino acid; the salt anion can be any suitable anion, either inorganic or organic. These novel salts have the following generic formula:

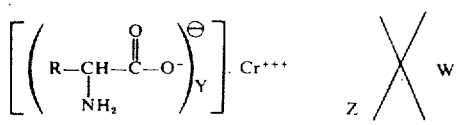

wherein R represents that portion of the alpha amino acid not specifically depicted in the formula, Y is a whole integer and is 1 or 2, X is an anion and Z and W are whole integers selected to electrostatically balance the cationic and anionic charges of the complex salt. These novel compounds are useful nutritional supplements, both for animals and humans, in that they provide a readily available source of chromium plus 3 ion necessary for dietary balance. In addition, the compounds are provided in a form which effectively increases the absorption, distribution and utilization efficiency of the chromium within the body system of animals and humans.

7 Claims, No Drawings

1:1 AND 2:1 CHROMIUM, ALPHA AMINO ACID COMPLEX SALTS

CROSS REFERENCE TO A RELATED APPLICATION

This application is a continuation-in-part of Ser. No. 395,848, filed Sept. 10, 1973, which is a continuation-in-part of Ser. No. 163,046, filed July 15, 1971, now abandoned.

BACKGROUND OF THE INVENTION

The importance of an adequate supply of chromium, in the oxidation state plus 3, to the diet of both animals and humans has often been reported in the literature. Adequate history intake of chromium, in the oxidation state plus 3, for swine, cattle and poultry has been known for some time to be of importance. Very importantly, an adequate level of chromium plus 3 in the diets of swine, poultry, and cattle has been shown as important for healthy growth of animals and increased weight gain.

With regard to humans, chromium deficienecies have been reported as possibly tied to glucose metabolism, lipid metabolism, hypercholesteremia, tendencies to atherosclerosis, and impaired glucose utilization.

While the importance of adequate chromium plus 3 levels in the diet of both animals and humans has been known and reported for some time, maintenance of adequate chromium plus 3 levels in the dietary intake has not necessarily been easy to achieve. For example, dietary supplementation by utilization of conventional salts of chromium such as chromium chloride has been reported in the literature as inadequate. This is so because the chromium exists in a form which is not readily absorbed from the gastrointestinal tract and therefore may not be distributed and utilized effectively in the body. Thus, because of the poor and erratic absorption of chromium from conventional salts, bound together by simple electrostatic attraction, a readily absorbable form of chromium plus 3 is needed in order to provide adequate and effective dietary supplementation by the addition of chromium plus 3 ions to the diet.

Accordingly, it is an object of this invention to provide novel chromium compounds wherein the chromium is in a form which can be readily absorbed after ingestion by animals and readily distributed and utilized in order to provide adequate chromium levels for proper health, weight gain, and dietary balance of animals.

Yet another objection of this invention is to provide a process for making novel chromium compounds which is simple to perform and can be economically utilized in large-scale plant practice to prepare the compounds of this invention in bulk for ready utilization in large quantities to supplement the diets of animals and humans.

The method of accomplishing these and other objects will become apparent from the following description of the invention.

SUMMARY OF THE INVENTION

This invention relates to the preparation of novel chromium compounds. The chromium in these compounds exists in the oxidation state plus 3. The novel chromium compounds have the formula:

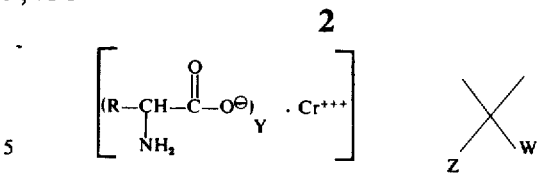

In this formula R represents that portion of the alpha amino acid not specifically depicted in the formula, Y is a whole integer and is 1 or 2, depending upon whether the compounds are 1:1 complexes or 2:1 complexes. The ratio 1:1 or 2:1 refers to the ratio of the alpha amino acid moiety to the chromium ion present in the compound. X is an anion and Z and W are whole integers selected to electrostatically balance the cationic and anionic charges of the complex salt. In a preferred form these compounds relate to complex salts formed from natural amino acids, i.e. those alpha amino acids found to be present in protein. In a most preferred form the alpha amino acids are those amino acids normally termed "essential amino acids". Such compounds, it is believed because of a complex formed between the chromium and the alpha amino acid are in a form which can readily be absorbed, distributed, and utilized within the biochemical system of animals and humans. They function as a readily available source of chromium for dietary supplementation.

The invention also relates to a simple and economically feasible process for making the above-described compounds.

DETAILED DESCRIPTION OF THE INVENTION

It is important to note that the compounds of this invention are complexed salts of chromium in the plus 3 oxidation state. The chromium ion exists in oxidation states of plus 6, plus 3, and plus 2. Chromium plus 2 is very readily oxidized upon exposure to atmospheric oxygen to chromium plus 3. Chromium plus 6 is toxic to man and animals and is not of any importance to proper dietary balance. Chromium plus 3, on the other hand, is the form of the chromium ion which is needed for proper health of animals and humans. Thus, as used hereinafter the word "chromium" is intended to mean only chromium in the plus 3 oxidation state unless otherwise specifically stated.

It is also important to note that the compounds of this invention are referred to herein as "chromium alpha amino acid complexed salts". These salts are to be carefully distinguished from conventional salts as, for example, chromium chloride, which contains only an electrostatic attraction between the cation and the anion. The complexed salts of this invention differ from conventional salts, like chromium chloride or sodium chloride, in that while they have an electrostatic attraction between the cation and the anion, there is also a coordination bond formed between the chromium and the amino moiety of the particular alpha amino acid employed in forming the complex salt. The formula for these compounds has previously been provided. The cation of these complexed salts is represented by the bracketed material in the previously provided formula. Sterically, the cation moiety of a 1:1 complex of chromium and an alpha amino acid can be represented as follows:

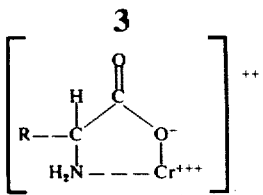

Sterically, the cation moiety of a 2:1 complex of chromium and an alpha amino acid can be represented as follows:

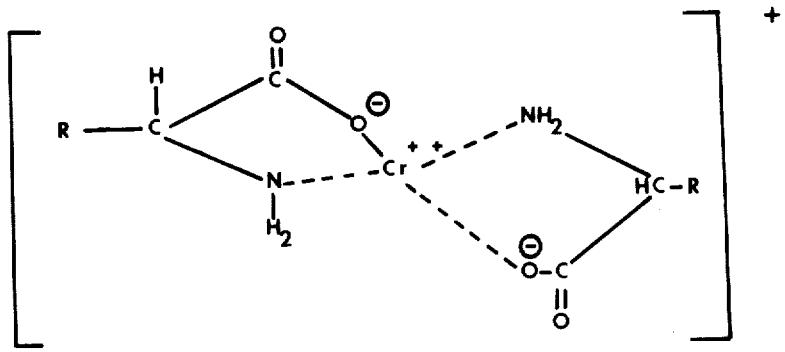

As can be seen from the steric formulas a five-membered ring formation exists between the chromium ion which is complexed by a coordinate bond with the alpha amine moiety and by an electrostatic attraction with the carboxylic acid moiety of the alpha amino acid. In the first formula shown immediately above, the complex is formed by a 1:1 ratio of alpha amino acid molecules and and chromium ions with each chromium ion becoming complexed with one alpha amino acid molecule. The entire cation, depicted by the material inside of the brackets, has a net charge of plus 2. The second formula shown immediately above is a 2:1 ratio complex of alpha amino acid molecules with the chromium ion. As can be seen from that formula, two alpha amino acid molecules complex with one chromium ion. Thus two five-membered ring formations exist within the cation of the complex salt. As can be seen from the material enclosed in the brackets, the complex salt wherein the complex is a 2:1 complex has an overall electrostatic charge of plus one. Providing these 1:1 and 2:1 complex ions of chromium and alpha amino acids has been found of great importance in insuring gastro-intestinal absorption of the chromium and its subsequent distribution and effective utilization within the biochemical system and body of animals and humans.

In the above-presented formulas the alpha amino acid, is depicted by showing the carboxylic acid moiety thereof and the alpha amino moiety thereof. R represents the remaining portion of the molecule. Of course R will vary depending upon the particular alpha amino acid being employed. However, those alpha amino acids suitable for utilization of this invention are generally the alpha amino acids that have been found in proteins. This includes both essential and nonessential alpha amino acids. These natural amino acids, for reasons not specifically known, when associated by coordinate bonding with the chromium ion greatly enhance the absorption, distribution and utilization of the chromium within the biochemical system of animals and humans to which these chromium supplements have been fed. The natural amino acids which have been found in proteins include: alanine, arginine, aspartic acid, cysteine, cystine, ornithine, 3,5 diiodotyrosine, glutamic acid, glycine, histidine, hydroxylysine, hydroxyproline, isoleucine, leucine, lysine, methionine, phenylalanine, proline, serine, threonine, thyroxine, tryptophan, tyrosine, and valine.

While all of these natural amino acids have been found to be effective, those most preferred are what are commonly termed the essential amino acids. Of course, essential alpha amino acids refer to those amino acids which must be fed to young animals and humans if proper growth is to take place. Apparently these alpha amino acids which are deemed essential must be fed to the animals and humans as they evidently cannot be synthesized in large enough quantities by the animals or humans from other materials in their diet. Those essential alpha amino acids which are preferred for utilization in forming the 1:1 and 2:1 complex salts of this invention are arginine, histidine, isoleucine, leucine, lysine, methionine, phenylalanine, threonine, tryptophan, and valine. Glycine, while not an essential amino acid, is also a preferred alpha amino acid in that it is readily available and can easily be utilized for synthesis of the complex salts of this invention. The two most preferred natural alpha amino acids are glycine and methionine. For glycine R represents hydrogen, and for methionine R represents the following: $CH_3-SCH_2-CH_2-$.

As can be further seen from an examination of the above-presented formulas, in every instance chromium is in the plus 3 oxidization state. The electrostatic charge on the complex cation is either 1 or 2, depending upon whether the complex is a 1:1 complex of chromium and an alpha amino acid or a 2:1 complex. If the complex cation contains one chromium and one alpha amino acid moiety the electrostatic charge is plus 2. If, on the other hand, two alpha amino acid moieties are associated with one chromium plus 3 ion the overall electrostatic charge of the cation is plus 1. In the previously presented empirical formula Z represents the number of cations needed to provide an overall neutral charge on the complex salt. X represents the anion which as explained in more detail below can be any suitable anion and W represents the number of anions needed to provide the necessary overall neutral electrostatic charge.

As previously briefly mentioned, the selection of an anion is not critical. The anion can be an inorganic anion, an organic anion, a monovalent anion, a divalent anion, or a polyvalent anion. Preferably the source of the anion, X, is an inorganic acid. Suitable inorganic anions can be found in the halogen acid family, the sulphates, and the phosphates. Preferably, where the anion is an inorganic anion, it is selected from the group consisting of monovalent anions, such as halides, hydrogen sulphate, and dihydrogen phosphate.

The anion can also be an organic anion moiety derived from an organic acid. It can be derived from simple aliphatic carboxylic acids, both monobasic carboxylic acids and dibasic carboxylic acids. For example, the anion can be acetate, propionate, or oxalate. In addition, the acid source can be substituted aliphatic acids, both monobasic and dibasic, such as, for example, chloroacetic acid. The acid source of the anion may also be aromatic acids such as, for example, benzoic acid. It can also be aralkyl acids, both substituted and unsubstituted.

Where organic acid sources are utilized as a source of the anion for the salts of this invention, it is preferred that the source be a monobasic carboxylic acid and that the acid be either acetic acid, propionic acid, oxalic acid, or benzoic acid.

Surprisingly, a simple, straight-forward and, importantly, economically feasible process of preparing these chromium alpha amino acid complexed salts of this invention in a form readily utilizable for dietary supplementation has been developed.

In accord with the process of this invention, a chromium plus 3 salt, preferably chromium chloride, either in anhydrous form or in a hydrated form is reacted with the natural alpha amino acid in the presence of water. pH control has not been found to be particularly important and the pH provided by a water solution of these salts is satisfactory for performing the reaction. If chromium in the plus 3 oxidation state salts are not readily available, chromium oxide with the chromium in the plus 6 oxidization state can be reduced to chromium plus 3 by reaction with a reducing agent such as ethyl alcohol in the presence of sulfuric acid and heat to provide chromium plus 3 sulphate. This can then be utilized to perform the reactions of the invention. Water is utilized as the solvent in this reaction.

Preferably the chromium plus 3 salt is reacted with the alpha amino acid in equimolar quantities in the presence of a water solvent. Utilization of equimolar quantities insures complete reaction with a minimum of side reactions, or excess of ingredients. Of course, the quantity of alpha amino acid utilized in comparison with the molar quantity of the chromium cations available will determine whether 1:1 complexes are formed or 2:1 complexes are formed. If 1:1 complexes are formed, one mole of chromium ion is reacted with one mole of alpha amino acid. On the other hand, if 2:1 complexes are desired, two moles of alpha amino acid is reacted with one mole of chromium ions.

The product, i.e. the desired, 1:1 or 2:1 chromium alpha amino acid complex salt can be conveniently obtained from the reaction solution by drying, using conventional drying methods such as hot air oven drying, spray drying, or freeze drying. Drying can be done at atmospheric pressure, or under reduced pressure. The resulting complexes are generally hygroscopic solids, having the characteristic dark green color of chromium ion and are sparingly soluble in methanol and ethanol. Compounds when analyzed by instrumental and quantitative analysis reveal a proper ratio of chromium and alpha amino acid molecules to indicate the formation of 1:1 and/or 2:1 complex salts. The samples when analyzed by infra-red analysis and an examination of the absorption spectra indicate the absence of a strong peak at 2100 reciprocal centimeters, which is characteristic of alpha amino acids. In addition, there is a noted absence of the characteristic peaks of the amino acid per se. The different peak structures of the product from the peak structures of the reactants indicate the formation of complex ions. Additionally, the complex salts when titrated with .1 normal sodium hydroxide, and when the resulting titration curve is compared with a known titration curve for the amino acid and for starting chromium chloride salt, for example, the titration curve proves to be different than the titration curve for either of the starting materials indicating the formation of the complex salt.

The following examples are offered to further illustrate the preparation of and properties of the compounds of this invention.

EXAMPLE 1

(1:1 Chromium Methionine Chloride)

One mole of methionine is reacted with one mole of chromium chloride in the following manner. The chromium plus 3 chloride is dissolved in twice its weight of water. Methionine is slowly added to the solution as the solution is being heated on a steam bath and the formation of a thick syrup is noted. This syrup is dark green in color. The syrup, or paste, is dried in a hot air oven to form a dark green, dry mass. Quantitative and instrumental analysis both infra-red analysis, titration curve analysis, and conventional quantitative analysis, revealed the presence of 1:1 chromium methionine chloride. The product was a green solid, very soluble in water and less soluble in methanol and ethanol, and insoluble in isopropyl alcohol. Melting point analysis revealed that it did not melt at temperatures below 225° C.

EXAMPLE 2

(Preparation of 2:1 Chromium Methionine Chloride)

Two moles of methionine were reacted with one mole of chromium plus 3 chloride. Sufficient water was added to dissolve the chromium chloride and while heating the solution on a steam bath the two moles of dL methionine were added. Immediately the formation of a dark green, thick syrupy reaction mixture was noted. This paste was dried in a hot air oven to form a dark green, dry mass. The product was analyzed by quantitative analysis and found to contain about 77% of methionine, 13.55% of chromium and 9.35% of chlorine. These figures correspond to the mole per cent of each of methionine, chromium, and chlorine, present in a 2:1 complex of chromium methionine chloride. The 2:1 complex has a molecular weight of 384. The complex is noted to be very soluble in water and does not appear to melt in melting point analysis.

EXAMPLE 3

(1:1 Chromium Methionine Sulphate)

Two grams of chromium plus 6 oxide (0.02 mol) is reacted with 0.03 moles of sulphuric acid in the presence of 0.04 moles of ethyl alcohol. The chromium plus 6 oxide is reduced to chromium plus 3 sulphate. The reaction mixture is heated, and boiled until the solution turns green and no odor of acetaldehyde is given off. Thereafter 2.98 grams of dL methionine is added and the mixture is heated on a steam bath until a dark green colored paste forms. The mixture is dried in a hot air oven and instrumental, and quantitative analysis as previously described reveals the presence of a 1:1 complex chromium methionine sulphate salt.

EXAMPLE 4

(1:1 Chromium Glycine Chloride)

One mole of glycine is dissolved in water and one mole of chromium plus 3 chloride is added thereto. The mixture is heated in a steam bath until the formation of a dark green, syrupy product is noted, which is approximately 20 minutes. Thereafter the dark green product is dried in a hot air oven until completely dry to provide a dark green solid. The molecular weight of 1:1 chromium glycine chloride is calculated and found to be 169.90. Quantitative analysis of the product revealed a per cent of glycine of about 37.85%; a per cent of chromium of about 26.41%; and a per cent of chlorine of about 36.01%. These percentages correspond to the theoretical percentages obtainable by calculation for 1:1 chromium glycine chloride.

The products prepared in examples 1 through 4 when fed to animals, as well as humans, provide increased gastro-intestinal absorption and body distribution and utilization of the chromium plus 3 ion. In particular, the rate of absorption and distribution and utilization is compared with the literature reported rate of 0.5% for chromium chloride, a conventional salt found by electrostatic attraction and found to be substantially higher.

What is claimed is:

1. In solid form, a water soluble methionine chromium complex salt, of the formula:

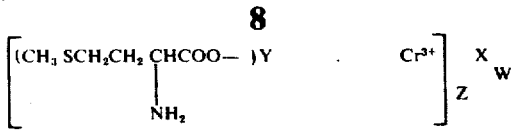

wherein Y is a whole integer and is 1 or 2, X is inorganic anion selected from the group consisting of chloride, sulphates, phosphates, and acetate, and Z and W are whole integers selected to electrostatically balance the cationic and anionic charges of the complex salt, said salt having the capability of enhancing the nutrition and health of animals and humans by effectively increasing the absorption, distribution, and utilization of chromium and methionine within the body system of said animals and humans.

2. The complex salts of claim 1 wherein the salt is a 1:1 ratio complex salt of methionine and chromium.

3. The complex salts of claim 1 wherein the salt is a 2:1 ratio complex salt of methionine and chromium.

4. A complex salt of claim 2 in which the anion is the chloride.

5. A complex salt of claim 3 in which the anion is the chloride.

6. A complex salt of claim 2 in which the anion is the acid sulfate.

7. A complex salt of claim 3 in which the anion is the acid sulfate.

* * * * *